United States Patent [19]

Mori

[11] Patent Number: 4,613,859
[45] Date of Patent: Sep. 23, 1986

[54] PAGER RECEIVER SELECTIVELY CHANGEABLE BETWEEN CALL NUMBER RECEPTION AND MESSAGE RECEPTION

[75] Inventor: Toshihiro Mori, Tokyo, Japan
[73] Assignee: NEC Corporation, Tokyo, Japan
[21] Appl. No.: 495,875
[22] Filed: May 18, 1983
[30] Foreign Application Priority Data
  May 31, 1982 [JP] Japan ............................. 57-80395[U]
[51] Int. Cl.[4] .............................................. G08B 5/22
[52] U.S. Cl. ............................. 340/825.44; 340/825.48; 455/38
[58] Field of Search .................. 340/825.04, 825.44, 340/825.48, 311.1; 455/36, 38, 54, 68, 32; 179/2 EC

[56] References Cited

U.S. PATENT DOCUMENTS

| | | | |
|---|---|---|---|
| 4,403,212 | 9/1983 | Masaki | 340/825.48 |
| 4,417,246 | 11/1983 | Agnor | 340/825.48 |
| 4,419,668 | 12/1983 | Ganucheau | 340/825.48 |

*Primary Examiner*—Donald J. Yusko
*Assistant Examiner*—Sharon L. Hodgkins
*Attorney, Agent, or Firm*—Sughrue, Mion, Zinn, Macpeak, and Seas

[57] ABSTRACT

In a pager receiver responsive to a call number signal preassigned thereto, a decoder (25) detects the call number signal to deliver a call indication signal to a loudspeaker (27) and is connected to a connector (36) for use in releasably receiving a controller (35) for detecting a message signal which follows the call number signal. A circuit portion (27, 150) is connected to the detector and the connector to produce the call indication signal simultaneously with detection of the call number signal when the decoder is singly operated. The circuit portion produces the call indication signal after detection of the message signal when the controller is coupled to the decoder through the connector.

4 Claims, 9 Drawing Figures

PAGER RECEIVER SELECTIVELY CHANGEABLE BETWEEN CALL NUMBER RECEPTION AND MESSAGE RECEPTION

BACKGROUND OF THE INVENTION

This invention relates to a pager receiver for use in a paging system.

In general, a pager receiver is carried by a user or a possessor movable within a service area of a paging system. A first type of conventional pager receivers produces a call tone, a beep tone, or an alert tone in response to a call number signal, namely, an identifying code which is assigned to the pager receiver and which is transmitted from a transmitting station, when the pager receiver is put in an active state by the user.

Development of semiconductor integration techniques has enabled a second type of conventional pager receiver to appear so as to display a message signal transmitted from the transmitting station immediately following the call number signal.

The paging system should allow the first type-pager receivers to coexist with the second type-pager receivers because some users only need a call tone service for production of the call tone while others, a display service for displaying the message signal.

Under these circumstances, two types of the conventional pager receivers must individually be prepared in order to satisfy the users' needs. Thus, it is extremely inconvenient to individually prepare and administrate two types of pager receivers.

It may be possible to use the second type-pager receivers in common to the call tone service and the display service. However, the second type-pager receivers are not beneficial for the users requiring the call tone service alone because it is expensive and bulky as compared with the first type-pager receivers.

SUMMARY OF THE INVENTION

It is an object of this invention to provide a pager receiver which is applicable in common to both of a call tone service and a display service.

It is another object of this invention to provide a pager receiver of the type described, which is compact and inexpensive when the pager receiver is used for a call tone service alone.

It is a further object of this invention to provide a pager receiver of the type described, which is convenient for preparation and administration of the pager receiver.

A pager receiver to which this invention is applicable is responsive to a call number signal preassigned thereto for producing a call indication signal indicating that the pager receiver is called. The pager receiver comprises first means responsive to the call number signal and selectively operable in an independent and a dependent mode of operation for producing a first and a second output signal in the independent and the dependent modes, respectively. The first output signal is produced as the call indication signal substantially immediately responsive to the call number signal. The second output signal is produced a predetermined interval of time after the first means is supplied with the call number signal. The second output signal serves also as the call indication signal. The pager receivers comprises connecting means connected to the first means for putting the first means selectively in the independent and the dependent modes.

DESCRIPTION OF THE PREFERRED EMBODIMENTS

Figure 1:
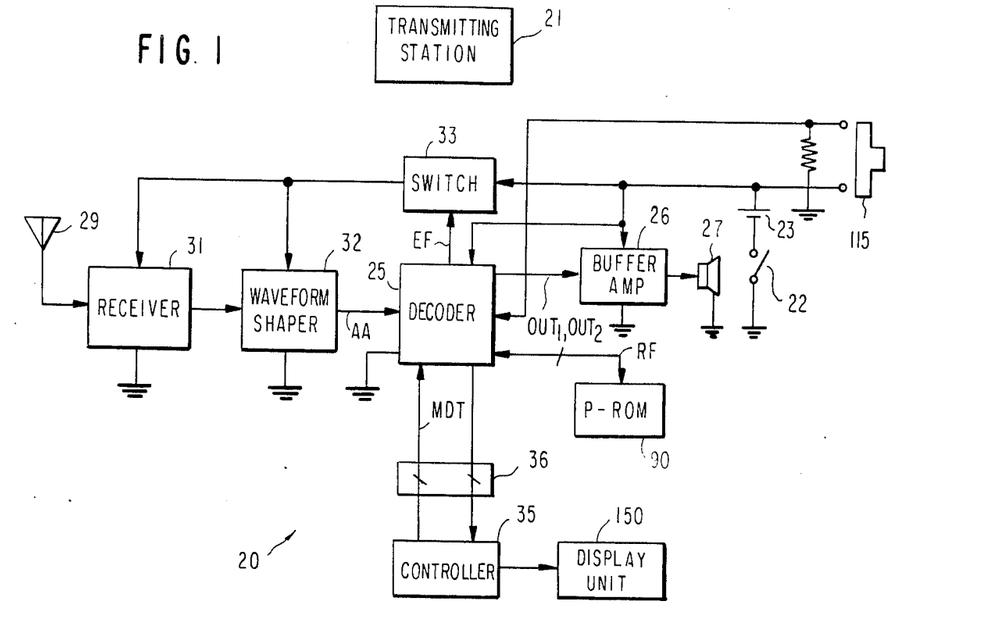
FIG. 1 shows a block diagram of a pager receiver according to a preferred embodiment of this invention, together with a transmitting station.

Referring to FIG. 1, a pager receiver 20 according to a preferred embodiment of this invention is for use in carrying out communication with a transmitting station 21 having a certain service area. A considerable number of similar pager receivers are communicable with the transmitting station 21 in the service area. Such pager receivers form a pager system together with the transmitting station 21.

A plurality of subscriber substations (not shown) are connected to the transmitting station 21. A call to a desired one of the pager receivers originates at one of the subscriber substations and is transmitted from the transmitting station 21 over the service area in the form of a radio calling signal.

Figure 2:
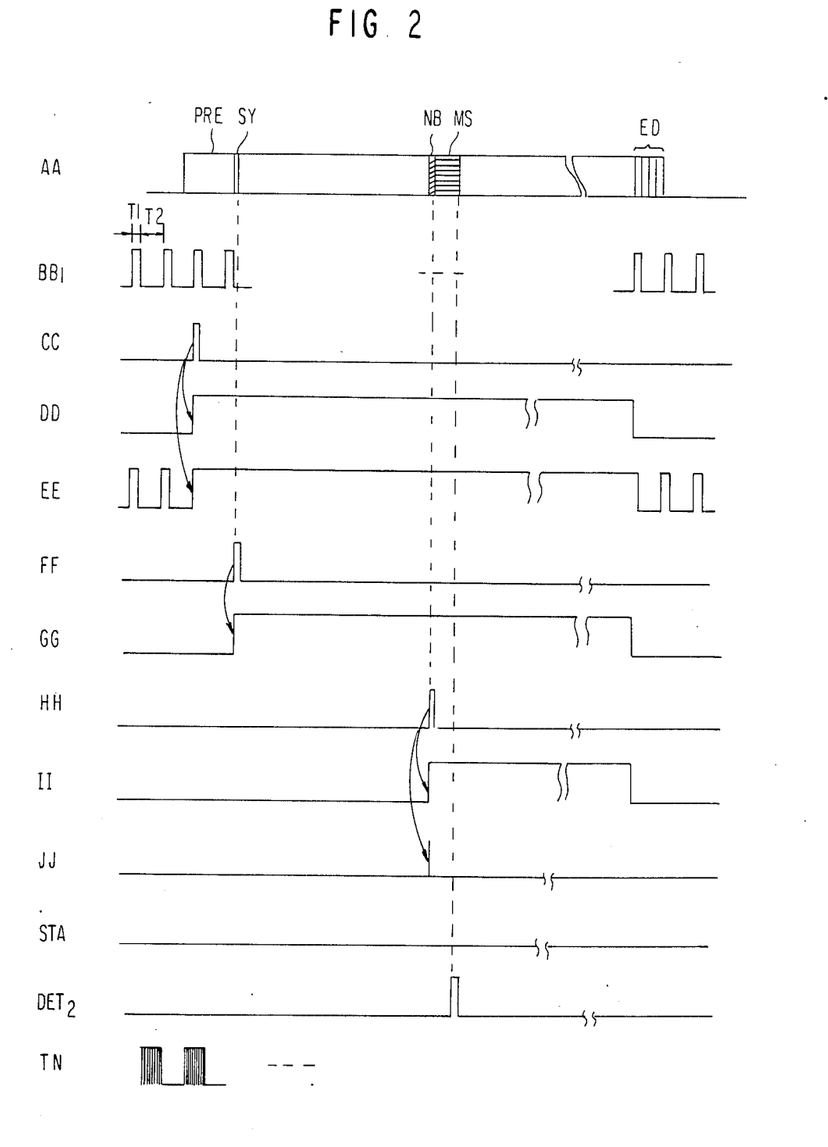
FIG. 2 shows a time chart for describing operation of a decoder for use in the pager receiver illustrated in FIG. 1.

Temporarily referring to FIG. 2, the radio calling signal AA has a frame comprising a preamble signal PRE and a frame synchronizing signal SY. A plurality of call number parts are arranged in the frame to put call number signals, respectively. The first one of the call number parts follows the frame synchronizing signal SY. Each of the call number parts is followed by each of message parts for arranging message signals. A specific one of the call number signals is depicted at NB while the corresponding one of the message signals is depicted at MS. The number of the message signals is not always equal to that of the call number signals because the call number signals are often accompanied by no message signals. Let the specific call number signal NB and the specific message signal MS be preassigned to the pager receiver 20 illustrated in FIG. 1. The message part is succeeded by a plurality of end signals ED. It is assumed that the BCH (Bose-Chaudhuri-Hocquenghem) code (31,21) as called in the art is used as the frame synchronizing signal, the call number signal, the end signal, and the message signal.

Turning back to FIG. 1, the pager receiver 20 comprises a switch 22 and a battery 23 connected to the switch 22. When closed, the switch 22 puts the pager receiver 20 in an active state. During the active state, an electric voltage is supplied without interruption to a decoder 25 and buffer amplifier 26 connected to the decoder 25. The buffer amplifier 26 drives a loudspeaker 27. The radio calling signal (shown at AA in FIG. 2) is supplied from the transmitting station 21 to the decoder 25 as a reception calling signal through an antenna 29, a receiver 31, and a wave-form shaper 32 in the known manner. Anyway, the reception calling signal has a format similar to that of the radio calling signal AA and will be designated, together with various parts of the reception calling signal, by the same reference symbols as in the radio calling signal AA.

The receiver 31 and the wave-form shaper 32 are connected to the battery 23 through a power saving switch 33 controlled by the decoder 25. The power saving switch 33 is operable to intermittently deliver the electric voltage to both of the receiver 31 and the wave-form shaper 32 while the preamble signal PRE is not received by the pager receiver 20. In other words, the power saving switch 33 is repeatedly put into a conductive and a non-conductive state under control of the decoder 25 during no reception of the preamble signal PRE. Let the conductive and the non-conductive states last 60 milliseconds and 1005 milliseconds, respectively. Thus, the power saving switch 33 serves to reduce power consumption in cooperation with the decoder 25.

Figure 3:
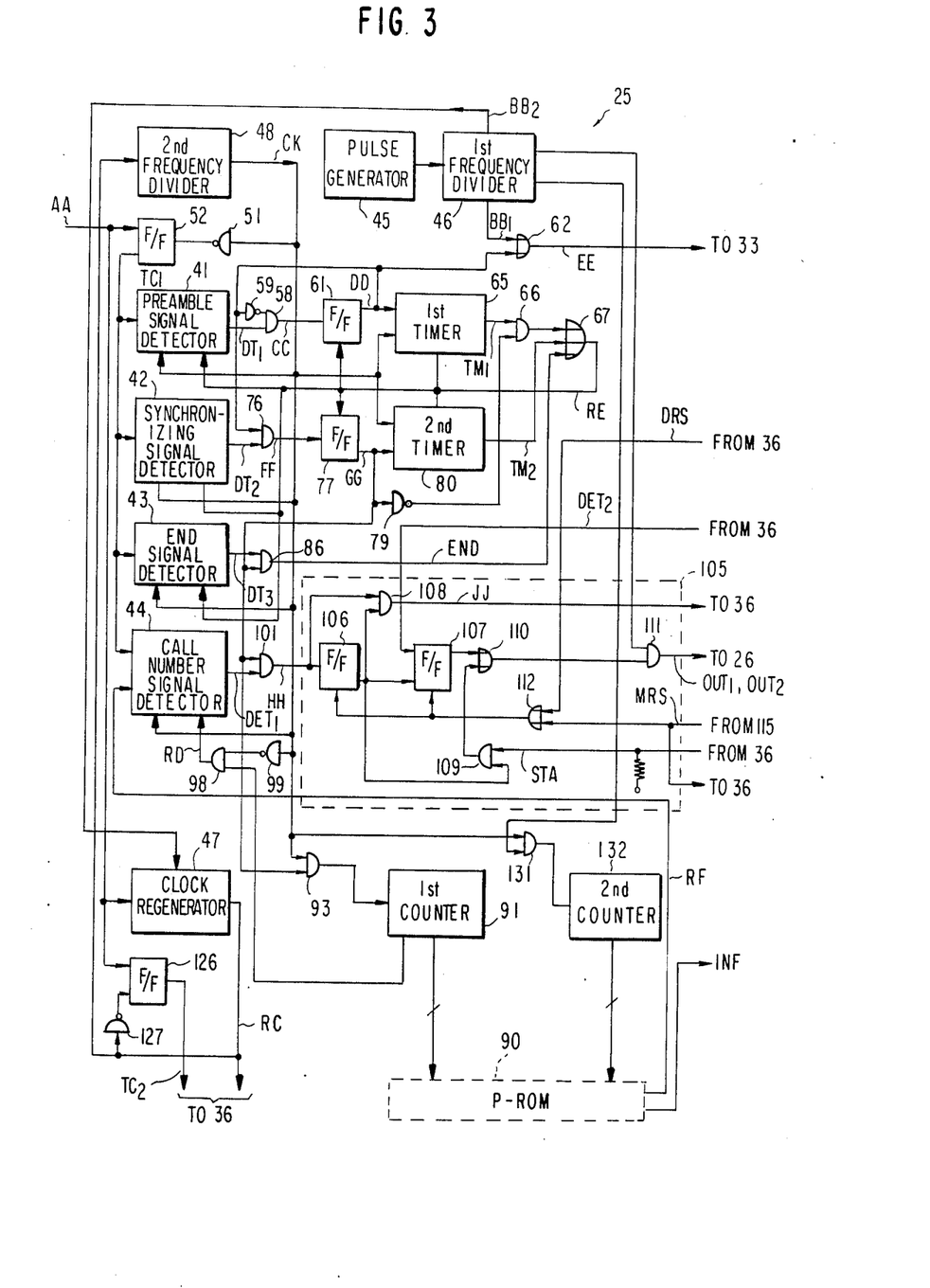
FIG. 3 shows a block diagram of the decoder illustrated in FIG. 1.

Referring to FIG. 3 in addition to FIGS. 1 and 2, the illustrated decoder 25 is selectively operable in an independent and a dependent mode of operation. More particularly, the decoder 25 is disconnected from and connected to a controller 35 as will later be described in detail in the independent and the dependent modes, respectively. It suffices to say that the decoder 25 serves to detect the preamble signal PRE, the frame synchronizing signal SY, the specific call number signal NB, and the end signal ED. The controller 35 detects the specific message signal MS. Accordingly, the decoder 25 and the controller 35 may be called a first and a second decoder, respectively. For disconnection and connection of the controller 35, a connector 36 is laid between the decoder 25 and the controller 35. The connector 36 may be of a plug-in type.

As shown in FIG. 3, the first decoder 25 comprises a preamble signal detector 41, a synchronizing signal detector 42, an end signal detector 43, and a call number signal detector 44 for detecting the preamble signal PRE, the frame synchronizing signal SY, the end signal ED, and the specific call number signal NB, respectively. The respective detectors 41, 42, 43, and 44 will later be described with reference to FIGS. 4, 5, 6, and 7 and are operated in a mode common to both of the independent and the dependent modes.

Attention will at first be directed to the common mode. A pulse generator 45 supplies a first frequency divider 46 with a sequence of pulses having a predetermined repetition frequency of, for example, 30 kHz. The first frequency divider 46 produces a sequence of first pulses (shown at $BB_1$ in FIG. 2) in order to render the power saving switch 33 (FIG. 1) into the conductive and the nonconductive states during reception of no preamble signal, as described before. Therefore, each of the first pulses $BB_1$ is present during a first duration $T_1$ of 60 milliseconds and appears at every second duration $T_2$ of 1005 milliseconds. The first frequency divider 46 further produces a sequence of second pulses $BB_2$ at a bit rate of, for example, 600 bits/second. The second pulse sequence $BB_2$ is sent to a clock regenerator 47 which is supplied with the reception calling signal AA from the wave-form shaper 32 (FIG. 1). The clock regenerator 47 is operable to establish bit synchronism and to produce a sequence of regenerated clock pulses RC which has the same bit rate as the second pulse sequence $BB_2$ and which is synchronized with the reception calling signal AA. The regenerated clock pulse sequence RC is delivered to a second frequency divider 48 to produce a sequence of clock pulses CK having a bit rate which is half as high as the bit rate of the regenerated clock pulse sequence RC. As readily understood from the above, the second frequency divider 48 has a factor equal to 2. The clock pulse sequence CK is sent through an inverter 51 to a delay flip flop 52 to which the reception calling signal AA is supplied. In the known manner, the delay flip flop 52 is set in response to the reception calling signal AA and in synchronism with the clock pulse sequence CK to produce an output signal $TC_1$. Thus, the delay flip flop 52 serves as a synchronization circuit for the reception calling signal AA. The output signal $TC_1$ may be called a first timed calling signal.

Figure 4:
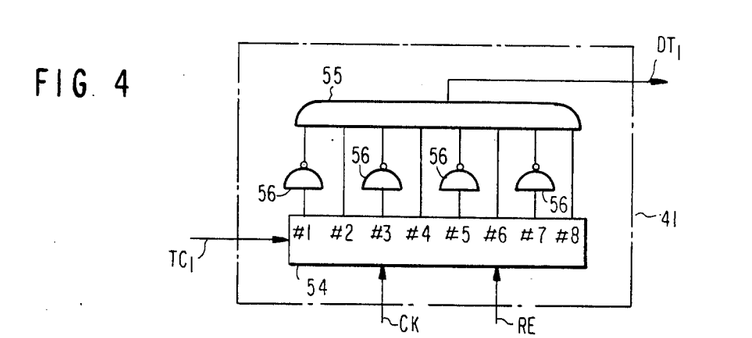
FIG. 4 shows a block diagram of a preamble signal detector illustrated in FIG. 3.

Referring to FIG. 4 together with FIG. 3, the first timed calling signal $TC_1$ is fed to the preamble signal detector 41 responsive to the clock pulse sequence CK and a reset pulse RE given in a manner to be described. In FIG. 4, the preamble signal detector 41 comprises a shift register 54 having eight stages for successively storing the timed calling signal $TC_1$ to produce first parallel bit signals of 8 bits. Every other one bit signals of 4 bits are directly supplied to an AND gate 55 while the remaining bit signals are supplied to the AND gate 55 through inverters 56. In this structure, when eight consecutive bits of the preamble signal PRE is coincident with a pattern of "01010101," the preamble signal detector 41 produces a preamble detection signal $DT_1$ representative of detection of the preamble signal.

It should be noted here that the detection of the preamble signal PRE is carried out during the conductive state of the power saving switch 33. The preamble detection signal $DT_1$ is therefore produced through the AND gate 55 when the preamble signal PRE is partly detected by the preamble signal detector 41.

In FIG. 3, the preamble detection signal $DT_1$ is supplied to an AND gate 58 initially enabled through an inverter 59 and produces a preamble output signal as shown at CC in FIG. 2. Responsive to the preamble output signal CC, a delay flip flop 61 is set to produce a first flip flop output signal as depicted at DD in FIG. 2. The first flip flop output signal DD is given to the inverter 59 to disable the AND gate 58 and is sent to an OR gate 62. Supplied with the first pulse sequence $BB_1$, the OR gate 62 delivers a control signal (depicted at EE in FIG. 3) to the power saving switch 33 (FIG. 1). As shown in FIG. 3, the control signal EE is determined by the first pulse sequence $BB_1$ before the detection of the preamble signal PRE and by the first flip flop output signal DD after the detection of the preamble signal PRE.

The first flip flop output signal DD is given from the delay flip flop 61 to a first timer 65. The first timer 65 which is previously reset is energized in response to the first flip flop output signal DD and thereafter counts the clock pulse sequence CK so as to time a first predetermined time interval of 1.2 second during which the frame synchronizing signal SY can be detected after detection of the preamble signal PRE. When the first predetermined time interval is timed by the first timer 65, the first timer 65 supplies a first timer signal $TM_1$ through an AND gate 66 to an OR gate 67.

Figure 5:
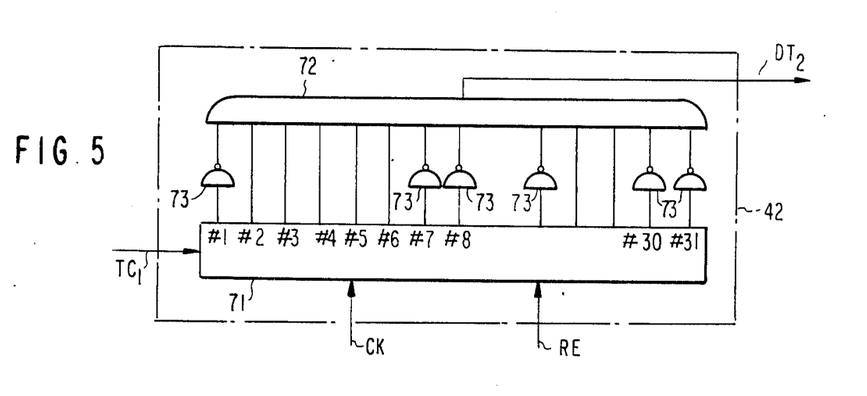
FIG. 5 shows a block diagram of a synchronizing signal detector illustrated in FIG. 3.

Referring to FIG. 5 afresh and FIGS. 2 and 3 again, the synchronizing signal detector 42 is supplied with the first timed calling signal $TC_1$ to detect the frame synchronizing signal SY and to prdouce a synchronization detection signal $DT_2$ representative of detection of the frame synchronizing signal SY. The frame synchronizing signal SY is composed of 31 bits in the illustrated calling signal. In FIG. 5, the synchronizing signal detector 42 comprises a shift register 71 having thirty-one stages for successively storing the first timed calling signal $TC_1$ to produce second parallel bit signals of 31 bits from the respective stages. The second parallel bit signals are given to an AND gate 72 directly and through a plurality of inverters 73 connected to those predetermined stages of the shift register 71 which are determined by a pattern of the frame synchronizing signal SY. At any rate, when the frame synchronizing signal SY is stored in the shift register 71, the synchronizing signal detector 42 produces a synchronization detection signal $DT_2$ representative of detection of the frame synchronizing signal SY.

In FIG. 3, the synchronization detection signal $DT_2$ is sent to an AND gate 76 which is enabled by the first flip flop output signal DD on detection of the preamble signal PRE. The AND gate 76 supplies a delay flip flop 77 with a synchronization output signal depicted at FF in FIG. 2. Responsive to the synchronization output signal FF, the delay flip flop 77 delivers a second flip flop output signal depicted at GG in FIG. 2 to an inverter 79 to disable the AND gate 66. Accordingly, the first timer signal $TM_1$ is suppressed by the AND gate 66 on detection of the frame synchronizing signal $DT_2$. The second flip flop output signal GG is delivered from the delay flip flop 77 to a second timer 80.

The second timer 80 times a second predetermined time interval to produce a second timer signal $TM_2$ after lapse of the second predetermined time interval. The second timer signal $TM_2$ is supplied to the OR gate 67. The second predetermined time interval is equal to a time interval necessary and sufficient to detect the specific call number signal NB. The second predetermined time interval is assumed to be 12 seconds in the illustrated timer 80.

It is mentioned here that the second timer 80 is energized only when the frame synchronizing signal SY is detected by the synchronizing signal detector 42 before lapse of the first predetermined time interval timed by the first timer 65.

Figure 6:
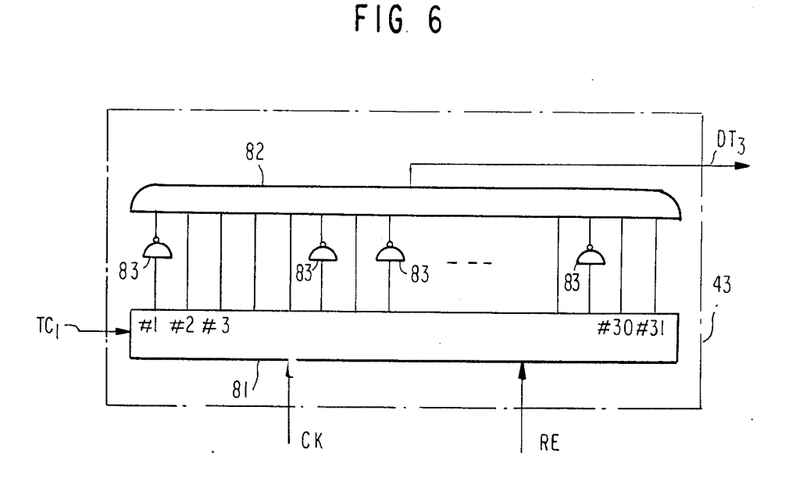
FIG. 6 shows a block diagram of an end signal detector illustrated in FIG. 3.

Referring to FIG. 6 together with FIG. 3, the end signal detector 43 is for detecting the end signals ED each of which is specified by a predetermined pattern of 31 bits. The end signal detector 43 produces an end detection signal $DT_3$ on detection of any one of the end signals ED. In FIG. 6, the end signal detector 43 comprises a shift register 81 having thirty-one stages for successively storing the first timed calling signal $TC_1$ in synchronism with the clock pulse sequence CK to produce third parallel bit signals of 31 bits. The third parallel bit signals are sent to an AND gate 82 directly and through a plurality of inverters 83 selectively arranged between the shift register 81 and the AND gate 82. The arrangement of the inverters 83 is determined by the pattern of each end signal ED. Anyway, the AND gate 82 produces the end detection signal $DT_3$ when all input signals of the AND gate 82 take the logic "1" level.

In FIG. 3, the end detection signal $DT_3$ is supplied to an AND gate 86 connected to the delay flip flop 77. When the AND gate 86 is enabled by the second flip flop output signal GG, the end detection signal $DT_3$ is sent as an end output signal END through the AND gate 86 to the OR gate 67.

When supplied with any one of the first timer signal $TM_1$, the second timer signal $TM_2$, and the end output signal END, the OR gate 67 delivers a reset signal RE to the detectors 41, 42, and 43, the delay flip flops 61 and 77, and the first and the second timers 65 and 80 to put them into reset states.

It should be recalled here that the first timer signal $TM_1$ is suppressed when the second flip flop output signal GG is produced by the delay flip flop 77 as a result of detection of the frame synchronizing signal SY. No reset signal is therefore produced when the frame synchronizing signal SY is detected by the synchronizing signal detector 42 within the first predetermined time interval determined by the first timer 65. Stated otherwise, the reset signal RE appears on no reception of the frame synchronizing signal SY.

If no reset signal appears within the first predetermined time interval, the second predetermined time interval is monitored by the second timer 80 in a manner to be described below. When the end detection signal $DT_3$ is produced from the end signal detector 43 within the second predetermined time interval, the reset signal RE is delivered to the above-mentioned elements. Otherwise, production of the reset signal RE is delayed until the second timer signal $TM_2$ is supplied from the second timer 80 to the OR gate 67. In this event, the reset signal RE appears after lapse of the second predetermined time interval.

At any rate, the first flip flop output signal DD takes the logic "0" level when the reset signal RE is produced from the OR gate 67. As a result, the OR gate 62 sends to the power saving switch 33 (FIG. 1) the first pulse sequence $BB_1$ as the control signal EE. In other words, the first flip flop output signal DD is continuously supplied as the control signal EE to the power saving switch 33, regardless of the first pulse sequence $BB_1$, as long as the reset signal RE is not produced from the OR gate 67. This means that the receiver 31 and the waveform shaper 32 are continuously energized by the power saving switch 33 while the first flip flop output signal DD takes the logic "1" level.

Figure 7:
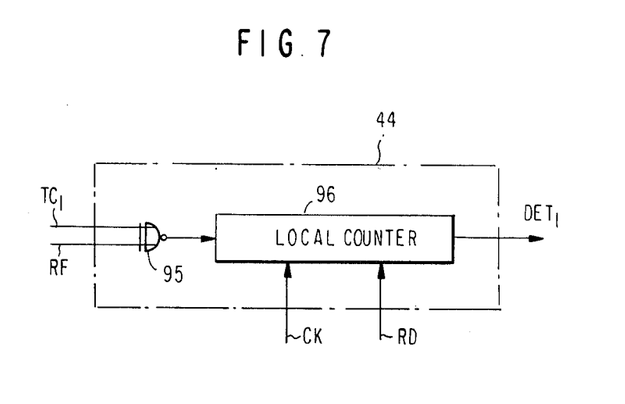
FIG. 7 shows a block diagram of a call number signal detector illustrated in FIG. 3.

Referring to FIG. 7 together with FIG. 3, the call number signal detector 44 is operable to detect the specific call number signal NB preassigned to the pager receiver 20 in question. For this purpose, the call number signal detector 44 cooperates in a manner to be described with a programmable read-only memory (P-ROM) 90 (FIG. 1) storing the specific call number signal. In the example being illustrated, each call number signal is of 31 bits. In addition to the specific call number signal, the programmable read-only memory 90 stores various information signals INF which are indicative of information relating to presence or absence of automatically resetting function, format information relating to a format of the reception calling signal AA, and the like.

A first counter 91 (FIG. 3) is coupled to the programmable read-only memory 90 to read the specific call number signal out of the predetermined address bit by bit. More particularly, the first coutner 91 is energized through an AND gate 93 to count the clock pulses CK to thirty-one while the AND gate 93 is enabled by the second flip flop output signal GG. The specific call number signal is read out of the predetermined address simultaneously with energization of the first counter 91 to be kept in a register (not shown) included in the programmable read-only memory 90 and is successively derived from the register in response to each count of the first counter 91. Thus, each bit of the specific call number signal is successively transferred as a reference signal RF of thirty-one bits from the programmable read-only memory 90 to the call number signal detector 44 in synchronism with the clock pulse sequence CK.

In FIG. 7, the call number signal detector 44 comprises an Exclusive NOR gate 95 responsive to the first timed calling signal $TC_1$ and the reference signal RF for producing a logic "1" level signal each time when one bit of the first timed calling signal $TC_1$ is coincident with the corresponding bit of the reference signal RF. Each logic "1" level signal is counted by a local counter 96 in synchronism with the clock pulse sequence CK. Similar operation is continuously carried out in the local counter 96 until a thirty-first bit of the reference signal RF appears in timed relation to a thirty-first one of the clock pulses CK. The first counter 91 supplies the logic "1" level to an AND gate 98 in response to the thirty-first clock pulse. After disappearance of the thirty-first clock pulse, the first counter 91 keeps the logic "1" level and the AND gate 98 is enabled in response to the disappearance of thirty-first clock pulse through an inverter 99 to deliver the logic "1" level to the call number signal detector 44 as a read-out request signal RD.

Responsive to the read-out request signal RD, the local counter 96 produces the logic "1" level signal when the count reaches thirty-one and the logic "0" level signal when the count does not reach thirty-one. The logic "1" level signal is given to an AND gate 101 (FIG. 3) as a call number detection signal or a first detection signal $DET_1$ representative of detection of the specific call number signal. The AND gate 101 produces the first detection signal $DET_1$ as a call number output signal depicted at HH in FIG. 2 when enabled by the second flip flop output signal GG.

The call number output signal HH is processed to produce a first and a second output signal $OUT_1$ and $OUT_2$ in the independent and the dependent modes in a manner to presently be described. For this purpose, a circuit portion 105 (FIG. 3) is put into operation in relation to the loudspeaker 27 (FIG. 1) through the buffer amplifier 26 and to the controller 35 (FIG. 1) through the connector 36. Briefly stated, the first output signal $OUT_1$ is supplied to the loudspeaker 27 through the buffer amplifier 26 in the independent mode immediately when the call number detection signal $DET_1$ is produced from the call number signal detector 44. The second output signal $OUT_2$ is supplied to the loudspeaker 27 after the message signal is detected by the controller 35. Thus, the second output signal $OUT_2$ appears a predetermined interval of time after the call number signal detector 44 is supplied with the call number signal NB.

More particularly, the circuit portion 105 comprises a first delay flip flop 106 responsive to the call number output signal HH, a second delay flip flop 107 connected to the first delay flip flop 106, and a first AND gate 108 connected to the AND gate 101 and the first delay flip flop 106. The circuit portion 105 further comprises a second AND gate 109 connected to the first delay flip flop 106, a first OR gate 110 connected to the second AND gate 109 and the second delay flip flop 107, and a third AND gate 111 connected to the first OR gate 110 and the first frequency divider 46. In addition, a second OR gate 112 is connected to the connector 36 (FIG. 1) and a reset switch 115 (FIG. 1) for use in resetting the first and the second delay flip flops 106 and 107.

Furthermore, a first connection is laid between the second delay flip flop 107 and the connector 36 to supply the second delay flip flop 107 with a message detection signal $DET_2$ representative of detection of the specific message signal when the controller 35 is connected to the connector 36. The message detection signal may be called a second detection signal. A second connection is connected between the connector 36 and the second AND gate 109 to supply the second AND gate 109 with a status signal STA which indicates whether the controller 35 is disconnected from the connector 36 or not. The status signal STA takes the logic "1" level and the logic "0" level on disconnection and connection of the controller 35, respectively. A third connection is laid between the second OR gate 112 and the connector 36 to supply a decoder reset signal DRS from the controller 35 to the first and the second delay flip flops 106 and 107. A fourth connection is connected between the first AND gate 108 and the connector 36.

In the independent mode in which the controller 35 is disconnected from the connector 36, let the specific call number signal be detected by the call number signal detector 44 and the first detection signal $DET_1$ be given as the call number output signal HH to the first delay flip flop 106. As a result, the first delay flip flop 106 produces a third flip flop output signal depicted at II in FIG. 2. The third flip flop output signal II is delivered to the second delay flip flop 107 and the second AND gate 109. Inasmuch as no message detection signal $DET_2$ is supplied from the controller 35 to the second delay flip flop 107 in the independent mode, the second delay flip flop 107 is left reset. On the other hand, the second AND gate 109 which is supplied with the status signal STA of the logic "1" level in the independent mode is opened in response to the third flip flop output signal II to enable the third AND gate 111 through the first OR gate 110. Since as the third AND gate 111 is given a tone signal (depicted at TN in FIG. 2) from the first frequency divider 46, the third AND gate 111 delivers the tone signal TN as the first output signal $OUT_1$ to the loudspeaker 27. As a result, the loudspeaker 27 produces the call tone during the presence of the flip flop output signal II. Thus, the first output signal $OUT_1$ serves as a call indication signal.

Let the specific call number signal be detected by the call number signal detector 44 in the dependent mode to produce the first detection signal $DET_1$ as the call number output signal HH. The first delay flip flop 106 is set in response to the third output signal HH to deliver the third flip flop output signal II to the second AND gate 109 and the second delay flip flop 107. In this event, the first AND gate 108 supplies the controller 35 with an energizing signal (depicted at JJ in FIG. 2) through the fourth connection and the connector 36. It is mentioned here that the logic "0" level is given as the status signal STA to the second AND gate 109 in the dependent mode, as depicted at STA in FIG. 2. The second AND gate 109 is therefore left disabled. On the other hand, the message or the second detection signal $DET_2$ is supplied from the controller 35 through the connector 36 to the second delay flip flop 107 after detection of the specific call number signal. Responsive to the message detection signal $DET_2$, the second delay flip flop 107 is turned into a set state because the third flip flop output signal II takes the logic "1" level. Under the circumstances, the logic "1" level is sent from the second delay flip flop 107 to the third AND gate 111 through the first OR gate 110 in synchronism with the message detection signal $DET_2$.

Thus, the second output signal $OUT_2$ is supplied as the call indication signal from the third AND gate 111 to the loudspeaker 27 to produce the call tone. As will readily be understood from the above, the second output signal $OUT_2$ is delayed relative to the first output signal $OUT_1$.

When the message signal MS is not correctly received by the controller 35, the decoder reset signal DRS is supplied from the controller 35 to the first and the second delay flip flops 106 and 107 through the second OR gate 112. The first and the second delay flip flops 106 and 107 are reset in response to the decoder reset signal DRS to stop production of the second output signal $OUT_2$. Therefore, no call tone is produced from the loudspeaker 27 when the message signal is erroneously received.

Figure 8:
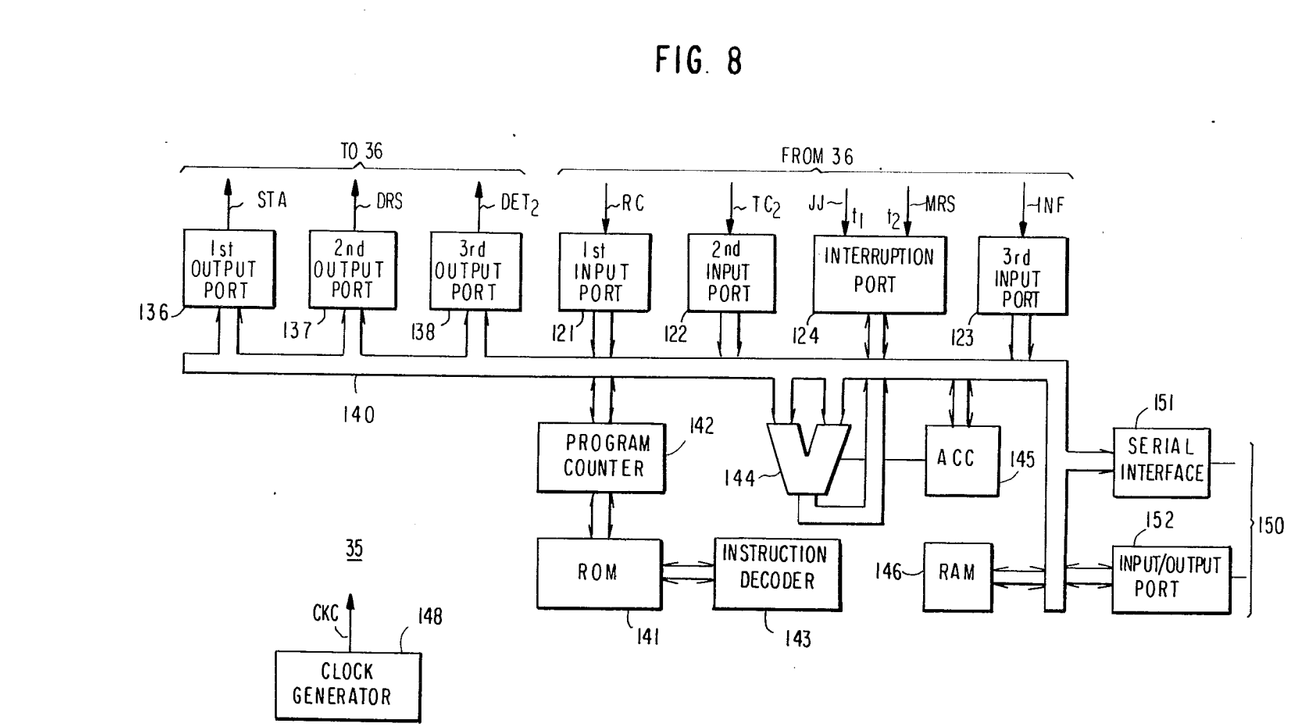
FIG. 8 shows a block diagram of a controller illustrated in FIG. 1.

Referring to FIG. 8 anew and FIG. 1 again, the controller 35 which is in cooperation with the decoder 25 in the dependent mode comprises first, second, and third input ports 121, 122, and 123 and an interruption port 124, all of which are connected to the connector 36 in the dependent mode.

The first input port 121 is supplied with the regenerated clock pulses RC from the clock regenerator 47 (FIG. 3) through the connector 36. It is to be noted here that the regenerated clock pulses RC are produced at the bit rate of 600 bits/second as mentioned before, and never pass through a frequency divider, such as the second frequency divider 48.

Temporarily referring back to FIG. 3, the reception calling signal AA is given to a delay flip flop 126 supplied with the regenerated clock pulses RC through an inverter 127. Consequently, the delay flip flop 126 produces a second timed calling signal $TC_2$ in synchronism with the regeneratd clock pulses RC. Thus, the second timed calling signal $TC_2$ is produced at a bit rate equal to twice the bit rate of the first timed calling signal $TC_1$. This means that the message signal MS is processed in the controller 35 at the bit rate determined by the regenerated clock pulses RC.

Turning back to FIG. 8, the second timed calling signal $TC_2$ is given to the second input port 122. The interruption port 124 has a first terminal $t_1$ supplied with the energizing signal JJ on detection of the specific call number signal and a second terminal $t_2$ supplied with a manual reset signal MRS given from the reset switch 115 (FIG. 1) through the decoder 25.

The third input port 123 is supplied through the decoder 25 with each of the information signals INF stored in the programmable read-only memory 90. In FIG. 3, each information signal INF can be read out of the programmable read-only memory 90 by the use of an AND gate 131 and a second counter 132. More specifically, the AND gate 131 is coupled to the first frequency divider 46 to be enabled at a prescribed interval of time and to allow the clock pulses CK to pass therethrough. The second counter 132 counts the clock pulses CK at the prescribed interval to a full count of three to supply each count as an address signal to the programmable read-only memory 90. Thus, the illustrated second counter 132 can indicate eight kinds of the information signals INF.

In FIG. 8, the controller 35 comprises a first output port 136 for sending the status signal STA to the second AND gate 109 (FIG. 3), a second output port 137 for delivering the decoder reset signal DRS to the first ad the second delay flip flops 106 and 107 through the second OR gate 112, and a third output port 138 for supplying the message detection signal $DET_2$ to the second delay flip flop 107.

The first through the third input ports 121 to 123 are coupled to a data but 140 together with the interruption port 124 and the first through the third output ports 136 to 138.

The controller 35 comprises a read-only memory 141 having a plurality of addresses and storing a sequence of instructions to be executed in the controller 35, a program counter 142 coupled to the data bus 140 and the read-only memory 141 for indicating each address, and an instruction decoder 143 for decoding each instruction read out of the read-only memory 141 to deliver a sequence of control signals (not shown) to various elements included in the controller 35. An arithmetic logic unit 144 is coupled to the data bus 140 together with an accumulator 145 and a random access memory 146. The arithmetic logic unit 144 carries out calculation under control of the control signals to store a result of calculation in the random access memory 146. The accumulator 145 is used to transmit data between the random access memory 146 and each of the ports 121 to 124 and 136 to 138. A combination of the instruction decoder 143, the arithmetic logic unit 144, and the accumulator 145 may be called a central processor. The controller 35 further comprises a clock generator 148 for producing a system clock which determines an instruction cycle time and a sequence of clock pulses which is used to put the controller 35 into operation. All of the above-mentioned elements are operable in a well known manner. Description will not be made about the individual elements any longer.

The controller 35 is energized in response to the energizing signal JJ (FIG. 2) which is supplied from the decoder 25 to the interruption port 124 when the specific call number signal is detected by the call number signal detector 44. Thereafter, the second timed calling signal $TC_2$ is supplied from the delay flip flop 126 to the second input port 122 in synchronism with the regenerated clock pulses RC received by the first input port 121. In this event, it is presumed that the second timed calling signal $TC_2$ includes the specific message signal MS, as illustrated at AA in FIG. 2. Each group of thirty-one bits of the message signal MS is sent to the arithmetic logic unit 144 to be processed therein under control of each instruction stored in the read-only memory 141. Among the thirty-one bits, twenty-one bits are memorized as information bits in the random access memory 146 because the BCH code (31,21) is used in the pager system. The remaining bits serve as check bits, as known in the art. Thus, all of information bits are successively stored in the random access memory 146 after errors are checked in each unit of the thirty-one bits with reference to the check bits in a well known manner.

If the number of the errors is equal to or more than a predetermined number, judgement is carried out as reception of no message signal. The predetermined number is equal to 2 in this example. As a result, the decoder reset signal DRS is sent from the second output port 137 to the first and the second delay flip flops 106 and 107 through the second OR gate 112. No call tone is produced by the loudspeaker 27 because neither the output signal OUT$_1$ nor the second output signal OUT$_2$ is supplied from the third AND gate 111 to the loudspeaker 27.

On the other hand, if all of the information bits are correctly received, the message detection signal DET$_2$ is supplied from the third output port 138 to the second delay flip flop 107. The second delay flip flop 107 is set to make the third AND gate 111 produce the second output signal OUT$_2$ as the call indication signal. Thus, the loudspeaker 27 produces the call tone in response to the call indication signal so as to inform the possessor of reception of the specific message signal MS.

Such a call tone can be stopped by closing the reset switch 115 illustrated in FIG. 1. This is because the manual reset signal MRS is transmitted as the decoder reset signal DRS from the reset switch 115 to the first and the second delay flip flops 106 and 107 through the second terminal t$_2$ of the interruption port 124 (FIG. 8), the second output port 137 (FIG. 8), and the second OR gate 112 (FIG. 3). In this event, the random access memory 146 is accessed to read the information bits out of the random access memory 146. The information bits are sent from the serial interface 151 to the display unit 150.

As shown in FIG. 1, the controller 35 cooperates with a display unit 150 which is to be described later in detail with reference to FIG. 9. For this purpose, the controller 35 comprises a serial interface 151 and an input/output port 152 connected to the display unit 150. The information bits are successively delivered from the random access memory 146 to the display unit 150 through the serial interface 151 while each of the commands is produced through the input/output port 152 to put the display unit 150 into operation in accordance with each command.

Figure 9:
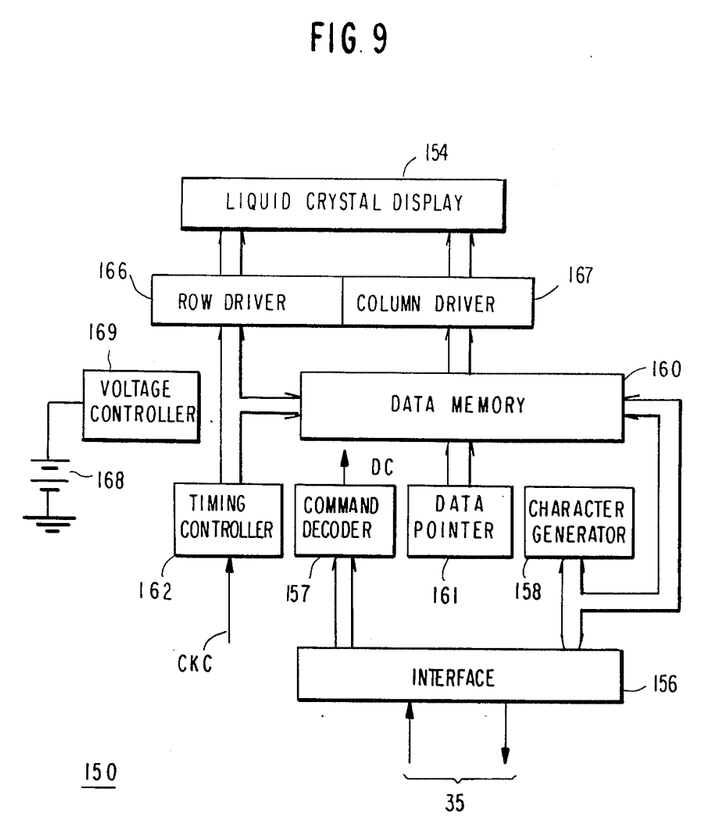
FIG. 9 shows a block diagram of a display unit illustrated in FIG. 1.

Referring to FIG. 9, the display unit 150 comprises a liquid crystal display 154 for providing displays in one to one correspondence to the information bits and an interface 156 connected to the serial interface 151 and the input/output port 152 for receiving the information bits and the commands, respectively. The liquid crystal display 154 may be a five-by-seven-dot matrix liquid crystal display. Supplied with each of the commands through the interface 156, a command decoder 157 produces display control signals DC determined by each command. The information bits are sent through the interface 156 to a character generator 158 to be converted into each display data signal which can be displayed by the liquid crystal display 154.

The display unit 150 comprises a data memory 160 having a plurality of addresses for storing each display data signal in each of the addresses. A data pointer 161 is coupled to the data memory 160 to specify each address in response to the display control signals DC. Each display data signal is stored in the data memory 160 in each address indicated by the data pointer 161 and is read out of each address in accordance with an indication of the data pointer 161.

In the example being illustrated, the clock pulses CKC are sent from the clock generator 148 shown in FIG. 8 to a timing controller 162. Responsive to the clock pulses CKC, the timing controller 162 delivers a drive signal to a row driver 166 for driving each row of the liquid crystal display 154. Simultaneously, each display data signal is sent in synchronism with the drive signal from the data memory 160 to a column driver 167 for driving each column of the liquid crystal display 154. Thus, the liquid crystal device 154 is driven by the row and the column drivers 166 and 167 to provide a visible display corresponding to each display data signal. Such a visible display can be changed to another visible display or erased when the reset switch 115 is closed after the call tone is stopped by closing the reset switch 115 or when the display lasts 8 seconds.

In the illustrated display unit 150, a battery 168 is connected to a voltage controller 169. The voltage controller 169 is for supplying electric voltage from the battery 168 to the row and the column drivers 166 and 167 in a time division fashion.

While this invention has thus far been described in conjunction with a preferred embodiment thereof, it will readily be possible for those skilled in the art to put this invention into practice in various manners. For example, various kinds of circuits may be substituted for the circuit portion 150 illustrated in FIG. 3.

What is claimed is:

1. A paper receiver for use in a paging system performing a call tone service and a display service by the use of call number signals common to said call tone service and said display service, said pager receiver is operable in response to a preassigned one of said call number signals to produce a call indication signal indicating that said pager receiver is called, said pager receiver comprising:

first means responsive to said preassigned call number signal and selectively operable in an independent and dependent mode of operation for producing a first and a second output signal in said independent and said dependent modes to enjoy said call tone service and said display service, respectively, said first output signal being produced as said call indication signal substantially immediately responsive to said preassigned call number signal, said second output signal being produced a predetermined interval of time after said first means is supplied with said preassigned call number signal, said second output signal serving also as said call indication signal; and connecting means connected to said first means for putting said first means selectively in said independent and said dependent modes.

2. A pager receiver as claimed in claim 1, wherein said first means comprises:

detecting means for detecting said preassigned call number signal to produce a first detection signal representative of detection of said call number signal; and signal producing means responsive to said first detection signal for selectively producing said first and said second output signals as said call indication signal.

3. A pager receiver as claimed in claim 2, said call number signal being selectively followed by a message signal, said pager receiver further comprising:

second means selectively attachable to said connecting means for detecting said message signal to produce in said dependent mode a second detection signal representative of detection of said message signal when said second means is connected to said connecting means;

said connecting means comprising:

a connector for receiving said second means;

a first wiring connecting between said signal producing means and said connector for supplying said second detection signal to said signal producing means when said second means is received by said connector; and a second wiring connected between said signal producing means and said connector for supplying a connection signal representative of connection of said second means to said connector when said second means is connected to said connector.

4. A pager receiver as claimed in claim 3, wherein said signal producing means comprises:

an electric circuit responsive to said first detection signal in said independent mode for producing said first output signal as said call indication signal and responsive to said first and said second detection signals and said connection signal in said dependent mode for producing said second output signal as said call indication signal when said second detection signal is supplied from said second means after production of said first detection signal.

* * * * *

UNITED STATES PATENT AND TRADEMARK OFFICE
CERTIFICATE OF CORRECTION

PATENT NO. : 4,613,859
DATED : September 23, 1986
INVENTOR(S) : T. MORI

It is certified that error appears in the above-identified patent and that said Letters Patent is hereby corrected as shown below:

Column 10, Line 4, delete "ad", and insert therefor --and--.

Column 10, Line 10, delete "but", and insert therefor --bus--.

Column 12, Line 18, delete "150", and insert therefor --105--.

Column 12, Line 20, delete "paper", and insert therefor --pager--

Signed and Sealed this

Twenty-fourth Day of March, 1987

Attest:

DONALD J. QUIGG

Attesting Officer     Commissioner of Patents and Trademarks